(12) United States Patent
Jaffrey et al.

(10) Patent No.: US 9,964,135 B2
(45) Date of Patent: May 8, 2018

(54) SMART WASHER FOR PRE-LOAD MONITORING

(71) Applicant: Cameron International Corporation, Houston, TX (US)

(72) Inventors: Andrew Jaffrey, Scotland (GB); Andy McNaney, Katy, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 26 days.

(21) Appl. No.: 14/971,670

(22) Filed: Dec. 16, 2015

(65) Prior Publication Data

US 2017/0175792 A1    Jun. 22, 2017

(51) Int. Cl.
*G01L 1/16* (2006.01)
*F16B 31/02* (2006.01)

(52) U.S. Cl.
CPC .................. *F16B 31/028* (2013.01)

(58) Field of Classification Search
CPC ......... F16B 31/028; F16B 31/02; G06K 7/10; G01L 1/16; B06B 1/06
USPC .............. 73/862.68, 761, 849, 760
See application file for complete search history.

(56) References Cited

U.S. PATENT DOCUMENTS

| | | | |
|---|---|---|---|
| 3,127,800 A * | 4/1964 | Kirouac | B25B 13/16 81/166 |
| 4,899,591 A | 2/1990 | Kibblewhite | |
| 6,378,384 B1 | 4/2002 | Atkinson et al. | |
| 7,412,898 B1 | 8/2008 | Smith et al. | |
| 7,698,949 B2 | 4/2010 | Akdeniz et al. | |
| 7,753,633 B2 * | 7/2010 | Genick, II | F16B 5/025 411/369 |
| 8,521,448 B1 * | 8/2013 | Ung | F16B 1/0071 702/42 |
| 8,683,869 B2 | 4/2014 | Herley et al. | |
| 8,810,370 B2 * | 8/2014 | Tillotson | H04Q 9/00 340/10.1 |
| 2006/0022056 A1 | 2/2006 | Sakama et al. | |

* cited by examiner

*Primary Examiner* — Harshad R Patel
*Assistant Examiner* — Octavia Hollington
(74) *Attorney, Agent, or Firm* — Helene Raybaud

(57) ABSTRACT

A pre-load monitor is arranged for use between a washer face of a fastener and a bearing surface of a fixture arranged to receive a portion of a shank of the fastener. The pre-load monitor, which can be in the form of a washer, includes a piezoelectric generator which generates the electrical power to measure, monitor and report the pre-load. The resulting electrical power produced is proportional to the pre-load and can be stored to provide the energy required to function electrical, electronic and communication circuits included in the washer. Alternatively, the pre-load monitor can be a half- or split ring (or a C-ring) constructed similarly to that of the washer, or the ring can be a two-piece gasket construction that includes an array of the washers.

20 Claims, 5 Drawing Sheets

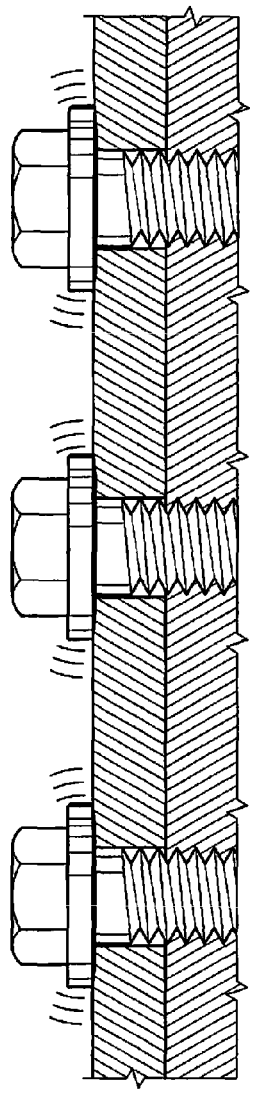
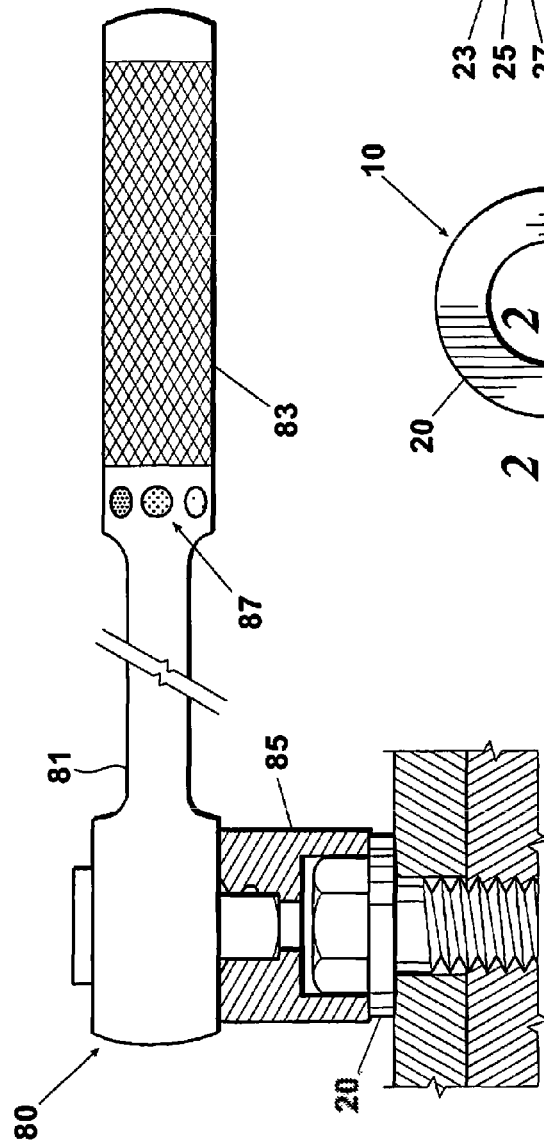
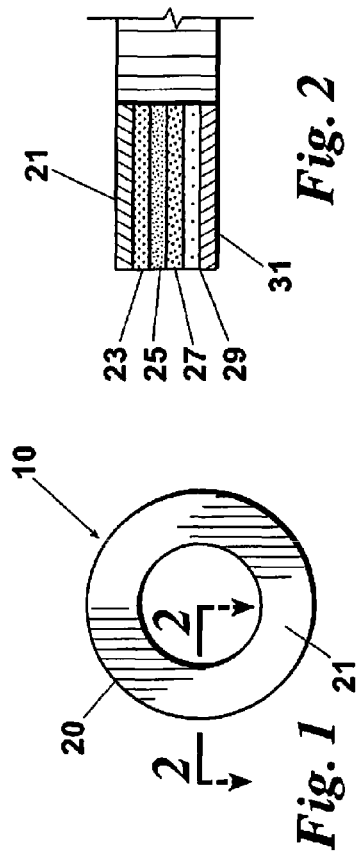

SMART WASHER FOR PRE-LOAD MONITORING

BACKGROUND OF THE INVENTION

This invention relates to systems and methods used to determine whether a correct pre-load is, or has been, applied to threaded fasteners such as nuts, bolts, and machine screws. More specifically, the invention relates to these systems and methods as applied to pressure-containing equipment like that used in the oil and gas industry.

For the correct and safe on-going operation of equipment, particularly pressure-containing equipment, it is important that the correct pre-load is applied to fasteners and that the load is consistent thereafter.

Traditional techniques of determining fastener pre-load typically rely on measuring the torque applied to the fastener when the correct pre-load is achieved. (Or, turning a nut through a specified angle that stretches the bolt the desired amount). However, differences in tolerances, lubrication, and friction, might require different torques be applied to similar fasteners in a fastening application to achieve the same preload among all of the fasteners. This is a significant limitation of traditional techniques and can lead to highly inconsistent forces, for example, around the circumference of a bolted flange.

Ultimately these differential forces can lead to failures, pressure escapes and fasteners coming apart. These situations can result in environmental damage and harm to personnel.

Prior art systems and methods modify the fastener itself and generally make use of ultrasonic techniques. For example, U.S. Pat. No. 4,899,591 to Kibblewhite discloses an ultrasonic transducer made of a thin piezoelectric sensor consisting of a piezoelectric film sandwiched between two thin electrodes. The transducer is permanently mechanically and acoustically coupled to a head of a fastener and is used to determine the length, tensile load, stress, or other tensile load-dependent characteristics of the member by ultrasonic techniques.

U.S. Pat. No. 7,412,898 B1 to Smith et al. makes use of a fastener having a bore that includes a grounding pin and a radio frequency identification ("RFID") transponder or tag exposed to the bore (see also US 20060022056 A1 to Sakama et al. disclosing a bolt with an RFID tag and chip for storing information and an antenna for transmitting wirelessly the information stored on the IC chip). The transponder generates a response signal with a unique identifier in response to a radio frequency signal from a transmitter. The grounding pin contacts and grounds the transponder to block transmittal of the response signal when a tensile load applied to the fastener is less than a minimum tensile load value.

U.S. Pat. No. 8,683,869 B2 to Herley et al. discloses a system and method of monitoring fastener pre-load using an ultrasonic transducer on the fastener and electronically transmitting the measured pre-load to a monitoring station for analysis (see also U.S. Pat. No. 7,698,949 B2 to Akdeniz et al. incorporating ultrasonic transducers with load bearing washers). The transducer, which is mounted to the head or threaded end of the fastener by an adhesive, is excited by a voltage pulse and the "time of flight" of the ultrasonic wave is used to indicate pre-load (relative to zero load time of flight). A reader or cap can be placed over the head of the fastener to engage the electrical contacts of the transducer and communicate via an electrical lead to the monitoring station. Alternatively, a radio frequency identification ("RFID") tag can be mounted on the fastener and operably connected to the transducer.

U.S. Pat. No. 6,378,384 B1 to Atkinson et al. discloses a force sensing device in the form of a washer that includes force sensitive resistors fabricated as thick film resistors which are printed and fired onto an electrically insulated substrate material. The washer is used to monitor pressure pulses of an underlying process or operation that a fastener is in communication with, not fastener pre-load. Others have experimented with ceramic washer designs that make use of piezoelectric filaments connected to a handheld device.

SUMMARY OF THE INVENTION

A pre-load monitor made according to this invention is arranged for use between a washer face of a fastener and a bearing surface of a fixture arranged to receive a portion of a shank of the fastener. The pre-load monitor, which can be in the form of a washer, includes a piezoelectric generator which generates the electrical power to measure, monitor and report the pre-load. The resulting electrical power produced is proportional to the pre-load and can be stored to provide the energy required to function electrical, electronic and communication circuits included in the washer. Alternatively, the pre-load monitor can be a half- or split ring (or a C-ring) constructed similarly to that of the washer, or the ring can be a two-piece gasket construction that includes an array of the washers.

Conversely, applying a small stimulating signal to the washer can used to measure a response of the piezoelectric generator and monitor the washer for changes in the pre-load condition. The washer can include load sensing hardware such as a strain gage based load cell that detects the deformation of the piezoelectric generator when stimulated.

The pre-load monitor can also include a "smart" tool such as a socket wrench in wireless communication with the washer either directly or via a socket. The tool can also be in wireless communication with its environment to provide positional information and to access and download data relating to the task to be performed, such as details of the pre-load required for individual fasteners.

A method of measuring fastener pre-load using the pre-load monitor includes the steps of placing a clamping force on the pre-load monitor, measuring the fastener pre-load using the electrical power generated, broadcasting the electrical power data generated, and calculating the fastener pre-load based upon the broadcast electrical power data. The broadcasting step can be powered by a portion of the electric power generated by the pre-load monitor, and this power also can be stored by the pre-load monitor.

The clamping force can be applied by the smart tool, and the tool can also be used to monitor fastener pre-load over time and apply make-up pre-load. The fastener pre-load can also be adjusted to account for a temperature gradient between the assembly environment and the operating environment of the fixture.

Monitoring could also be done by stimulating a portion or layer of the pre-load monitor lying adjacent to the flexible piezoelectric material, detecting a deformation of the flexible piezoelectric material in response to the stimulating step; and measuring an amount of the deformation. The amount of deformation can be determined by way of a load cell. The stimulating step can occur by way of a voltage source provided by a power supply internal to or external of the pre-load monitor.

A system of monitoring fastener pre-load includes a pre-load monitor arranged for use between a washer face of a fastener and a bearing surface of a fixture arranged to receive a portion of a shank of the fastener. The pre-load monitor has an upper and lower metallic layer that provides the mechanical properties needed to appropriately distribute the clamping force, a flexible piezoelectric material arranged to generate electric power in response to the clamping force, and a radio frequency identifier ("RFID") tag arranged to broadcast an amount of the electric power generated. In one preferred embodiment, the pre-load monitor is in the form of a circular washer. In another preferred embodiment, a gasket material is arranged about the washer. As with the method, the pre-load monitor can be used in combination with the smart tool.

The pre-load monitor can also include a stimulation layer lying adjacent to the flexible piezoelectric material and in communication with a power supply and a detection layer lying adjacent to the flexible piezoelectric material and arranged to detect a deformation of the flexible piezoelectric material. The pre-load monitor can also include an energy storage layer such as a battery or capacitor (or both) in communication with the flexible piezoelectric material.

Objectives of this invention include providing a pre-load monitor and method of its use that (1) can be used on a wide variety of fasteners and bolted connections, including but not limited to pressure-containing connections; (2) does not require any modification to the fastener and instead uses fixtures such as washers or rings that distribute fastener load to measure pre-load; (3) does not rely upon ultrasonic techniques and instead uses the electrical power generated by the fixture when under load to measure pre-load; (4) can apply different torques to similar fasteners being used in an application so that all of the fasteners are under a correct, consistent pre-load; (5) provides a correct pre-load in an assembly environment given a temperature gradient experienced by a fastener when in an in-use or operating environment; (6) continually monitors fastener load and can signal whether any changes are occurring from pre-load conditions; (7) makes a complete audit trail of the fixture and its corresponding fastener or fasteners; and (8) can be used in combination with a "smart" tool so that prior knowledge of the application by the operator is not required.

BRIEF DESCRIPTION OF THE DRAWINGS

FIG. 1 is a top plan view of a preferred embodiment of a pre-load monitor or fixture in the form of a circular washer having mechanical properties in addition to electrical generation and RF communication properties. The washer is sized for use in combination with the fastener typically used in a particular application.

FIG. 2 is a cross-section view of the washer of FIG. 1. A piezoelectric material generates electrical power that is used to power the fixture and its communication capabilities and to indicate pre-load.

FIG. 3 is a front elevation view of the washer of FIG. 1 under load and broadcasting an RF signal that could be read by an operator, a remote operated or autonomous underwater vehicle ("ROV" or "AUV"), by a neighboring washer, or by a tool in communication with the washer.

FIG. 4 is a side elevation view of a "smart" tool useful for applying make-up preload and communicating with the fixture. The tool includes a sensor interface, RF communication hardware, and a processor and a memory device capable of receiving and storing measurement data provided by the washer of FIG. 1 (see also FIG. 14).

ELEMENTS AND NUMBERING USED IN THE DRAWING FIGURES

Figure 5:
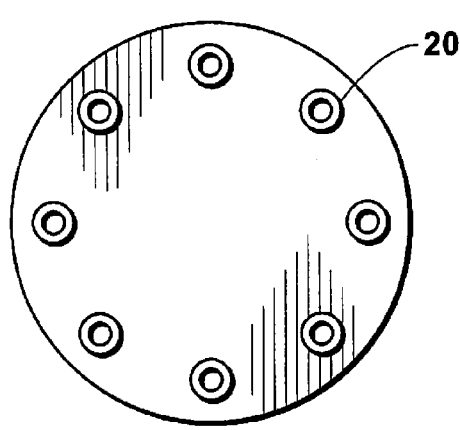
FIG. 5 is a top plan view of an array of the washers arranged about a flanged connection, plate or closure.

10 Pre-load monitor
20 Washer (ring or perforated plate)
21 Uppermost mechanical (metallic) layer
23 Power generation or piezoelectric layer
25 Electronics (including communications) layer
27 Energy storage or capacitance/battery layer
29 Antenna layer
31 Lowermost mechanical (metallic) layer
40 Washer
41 Uppermost mechanical layer
43 Detection (load sensing) layer
44 Load cell or strain gage wiring
45 Piezoelectric layer
47 Stimulation layer
49 Connection tab
51 Lowermost mechanical layer
60 Two-piece sensing gasket
61 Half- or split ring
63 Array of washers 20 or 40
65 Wire
67 Load sensing wire connection point
69 Power supply
71 One-piece c-ring
73 Molded portion of ring
80 "Smart" tool
81 Socket wrench
83 Handle
85 Socket
87 Display
89 Sensor
91 Processor 93 Signal generator
95 Communications hardware
97 Computer readable media
98 Reader
99 Memory
100 Protective device
101 Headset or ear protection
103 Eyewear
105 Optical device
107 Glove
109 Signal generator
111 Communications hardware

DETAILED DESCRIPTION OF THE PREFERRED EMBODIMENTS

In the preferred embodiments, the pre-load monitor is a washer, ring, or perforated plate, each used alone or in combination with a gasket material, and intended for use under a head of a fastener or a nut to spread the clamping force exerted by the tightened fastener. The pre-load monitor includes upper and lower metallic layers that provide mechanical strength and a piezoelectric material that is used to measure the pre-load using non-ultrasonic techniques. The piezoelectric material is preferably a flexible material (rather than, for example, a ceramic) and can be a printed flexible piezoelectric material. Additionally, the piezoelectric material can form a single layer of the pre-load monitor.

In one preferred embodiment, the pre-load monitor is a circular washer 20 made of a composite material which includes a piezoelectric material (see FIGS. 1 & 2). The upper- and lowermost layers 21, 31 of the washer 20 are the mechanical (metallic) layers, providing the mechanical properties normally found in a washer. A power generation layer 23, preferably in the form of a flexible piezoelectric material, resides adjacent to the uppermost layer 21. As the washer 20 compresses in response to a fastener being tightened, piezoelectric power is generated proportional to the applied load. Once the generated power reaches a predetermined level, the proper pre-load is achieved. In this way, each fastener in an application can obtain the correct pre-load and pre-load is consistent among the fasteners (see e.g. FIG. 5).

For any given application, the relationship between generated power and pre-load can be determined through routine experimentation using fastener testing techniques known in the art. Temperature effects could also be accounted for. For example, transitioning between 37° or 38° C. on the back deck of a drillship to about 3° or 4° C. on the seabed causes contraction that could potentially increase the load on the fasteners. A temperature-corrected pre-load could be determined and applied in the assembly environment to account for this contraction in the operating environment.

Figure 8:
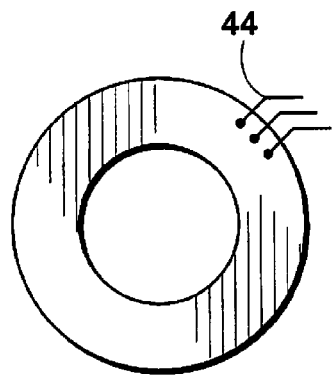
FIG. 8 is a top plan view of the detection layer of FIG. 7. The load sensing hardware can be a strain gage based load cell.
Figure 9:
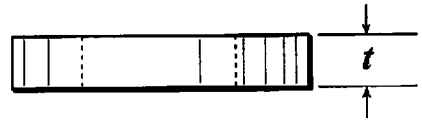
FIG. 9 is a front elevation view of the detection layer of FIG. 7. The thickness of the layer is determined based upon the application.

Alternatively, in another embodiment of the pre-load monitor 10 a piezoelectric layer 45 of a washer 40 is sandwiched between stimulation layer 47—which is stimulated with an incoming (external) signal and causes the piezoelectric layer 45 to deform (see FIG. 7)—and a detection or reaction layer 43. The detection layer 43 is sized to suit the application, load and hardware required for sensing and can include load sensing hardware such as a load cell or strain gauge wiring 44 (see FIGS. 8 & 9). Because the piezoelectric layer 45 is constrained by the fastener load, the resulting force can be used to determine changes in dimensions (e.g. gap) and pre-load. An upper- and a lowermost mechanical layer 41, 51 provide the mechanical properties normally found in a washer.

Stimulation could be repeated at pre-determined scheduled intervals to monitor the pre-load condition. The incoming signal could be provided wirelessly but is, more preferably, provided by an external power source (and its associated amplifier, oscillator and demodulator) in wired communication with the washer 40 (see e.g. FIG. 12). In this way, real-time monitoring of fastener load is achieved.

Figure 13:
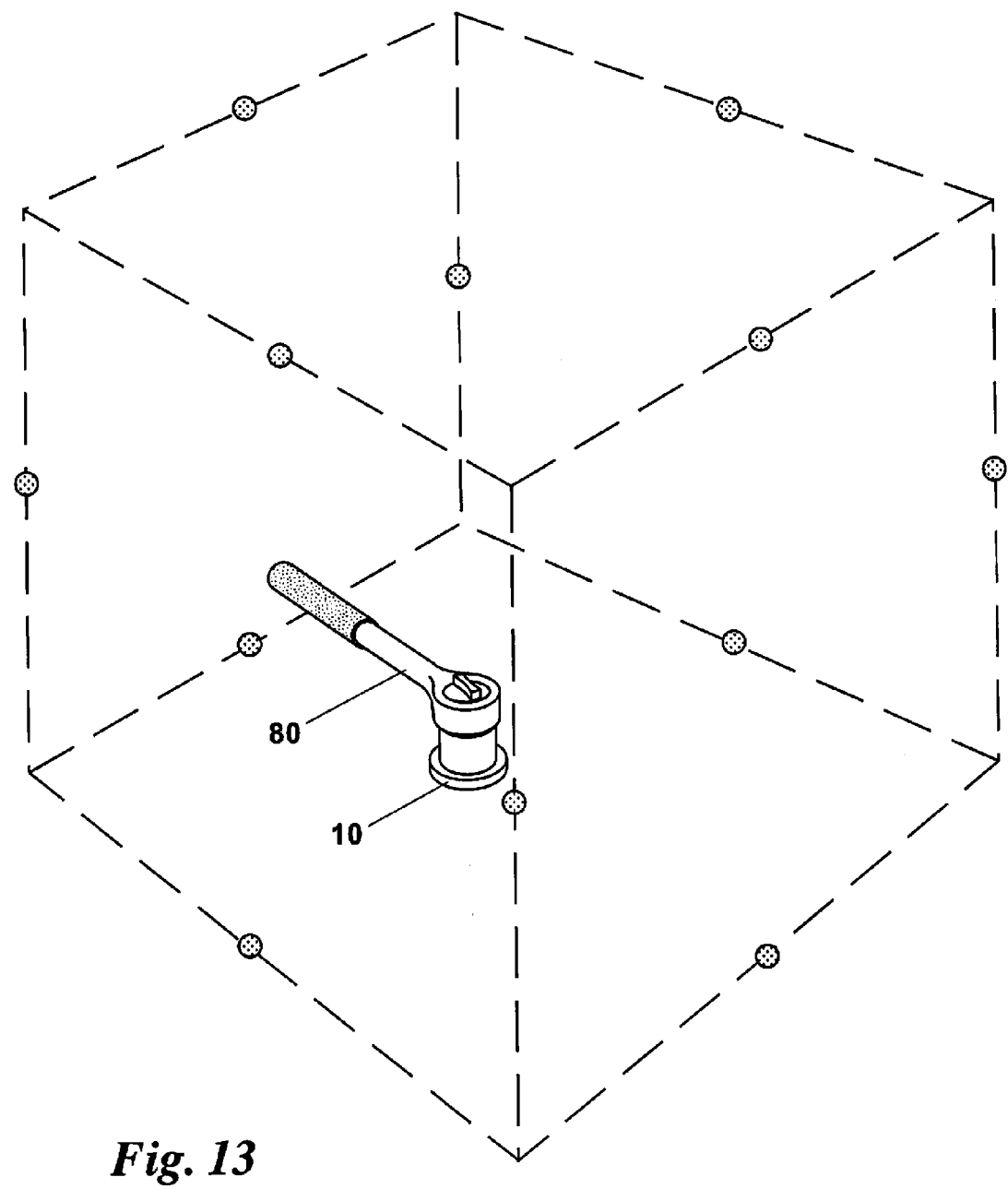
FIG. 13 is schematic illustrating the tool of FIG. 4 when in use in an RF (or similar) communication environment.
Figure 14:
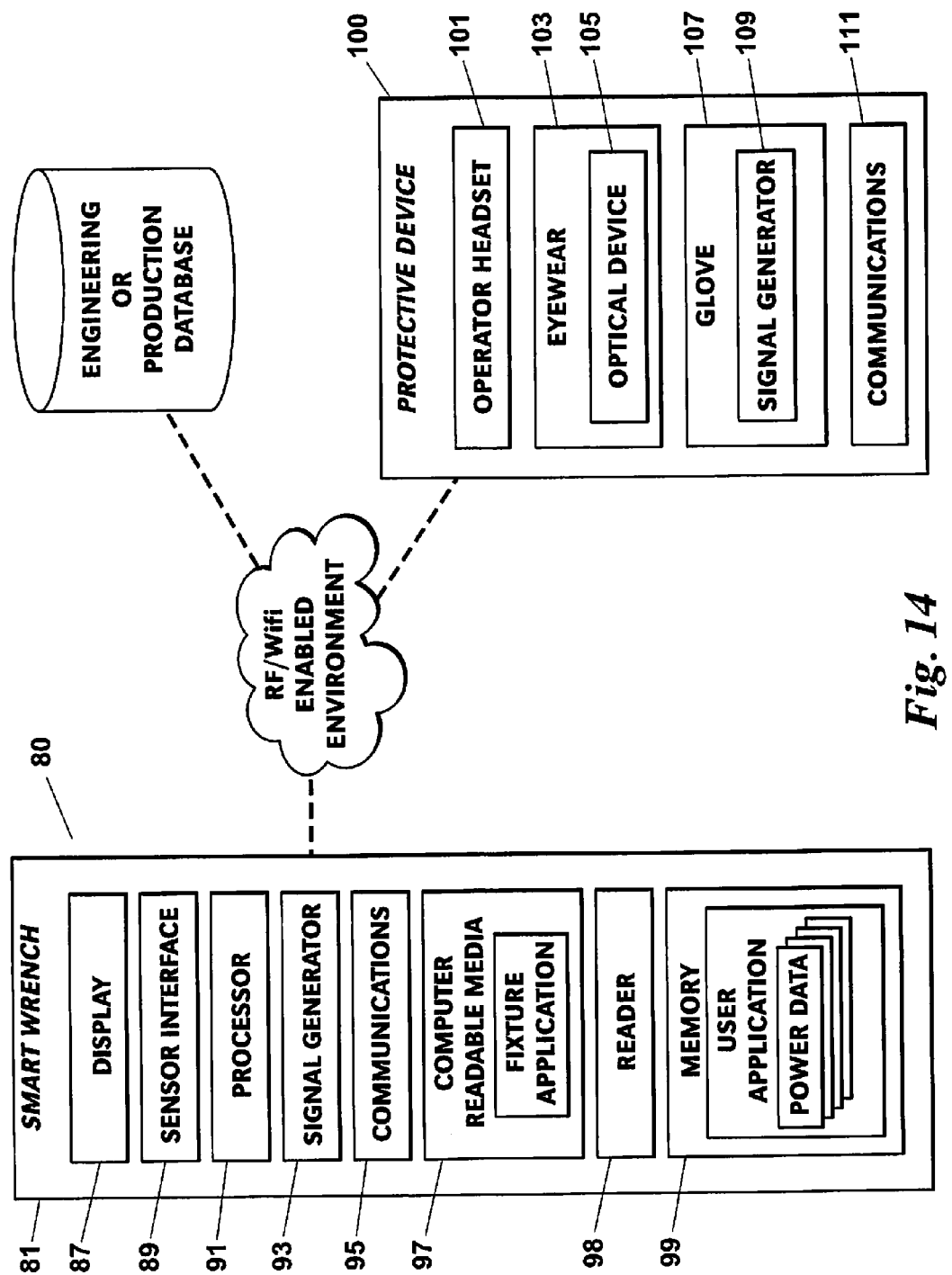
FIG. 14 is a schematic illustrating the tool of FIG. 4 as it interacts with other elements of the RF communication environment.

For make-up preload, a "smart" tool 80 preferably in the form of a socket wrench 81 can be used (see FIGS. 4, 13 & 14). The wrench 81 includes a sensor interface 89, RF communication hardware 95, and a processor 91, a memory device 99 capable of receiving and storing measurement data provided by the washer 20, 40, and computer readable media 97. Additionally, the wrench 81 could include a quick response ("QR") reader 98 to read a QR code of a fastener and then, based on this identification, automatically retrieve the necessary pre-load information associated with the fastener and stored in a database. Retrieval could be done wirelessly or by way of a USB connection in the handle 83 of the wrench 81. When being used in an RF environment, the location of the wrench 81, along with that of the washer 20, 40, can be determined and recorded.

The socket wrench 81 includes communications hardware 95 to provide bi-directional communication with the wifi-enabled environment in which it operates, and the wrench 81 is able to download from engineering or production databases data such as but not limited to the correct preload required for any given fixture as determined by such factors as location (manual or automatic) or to a reference such as a QR code. The wrench 81 can write data back to the database (business management software) to confirm information such as location, date, time, preload applied, serial numbers used (as appropriate), and temperature at the time of fastening. The sensor or sensor interface 89 can be located in the wrench 81 or the socket 85 or in a protective device such as a glove 107 (see FIG. 14), and additional sensors such as microelectromechanical systems ("MEMS") sensors could be included in the socket 85 to detect such parameters as orientation and angle. Communication with the washer 20, 40 can be direct by way of the socket 85 or wireless, including but not limited to magnetic, inductive, or near field means. A display 87 can be included on the handle 83 to indicate whether the pre-load is below, approaching, at, or beyond the correct predetermined pre-load (see FIG. 4). A similar type of display could also be included on the washer 20, 40.

The visual indication of status may also be made available to the user by use of appropriate eyewear 103. A wireless communications link between the wrench and an appropriate optical device 105 worn in front of the user's eyes can be used to display the alert colors within the user's field of view in a manner similar to a "heads-up" display. This visual indication technique may be incorporated into protective eye equipment commonly required to be worn in industrial environments.

The wrench 81 may optionally include a signal generator 93 such as one including an audio means of alerting the user to the status of the preload condition (e.g. a distinct tone for each of below, approaching, at, or over the correct preload value).

The audio settings may optionally be configurable to ensure satisfactory operation for a range of users and operating environments. The nature of the operating environment (e.g. background equipment noise or other sources of interference) will dictate which frequencies will be most difficult to distinguish. The alert tones generated by the signal generator 93 may be adjusted to avoid such background frequencies. Similarly, the age and aural condition of the user will determine their ability to hear certain frequency ranges (e.g. younger people tend to be able to hear higher frequencies that older people cannot). Therefore, the alert tones of the wrench 81 may be adjusted to suit the aural capabilities of the user.

Further, the audio alert may be broadcast by the wrench 81 to a protective device 100 such as a headset 101 worn by the operator. The preferred embodiment for this would be a wireless communications link such as commonly used between a mobile telephone and an ear-piece/headset. This may be used to provide a direct audio signal between the wrench 81 and the user. A protocol such as Bluetooth would be one option for this link. This approach will allow the incorporation of the audio alert into ear protection worn by the user either as an integral part of the protection device, or such that the earpiece can be worn underneath or inside the protection device without compromising the performance of the protection.

The signal generator 93 of the wrench 81 may optionally include a vibration means of alerting the user to the status of the preload condition. Similar to the audio embodiment, a distinct vibration pattern can be provided for each of below, approaching, at, or beyond the correct preload value.

In another preferred embodiment, a protective glove 107 generates the vibration within the structure of the glove 107 by way of a signal generator 109 rather than the socket wrench 81. The glove 107 includes hardware 111 for wireless or inductive communication with the wrench 81 or socket 85.

The socket wrench 81 can be battery powered and charged either at a base station or inductively, and could be part of a ROV or AUV tool. A solenoid or similar mechanism can be used to cause the wrench 81 to stop driving when the correct pre-load is reached. A signal from the washer 20, 40 could be provided to a hydraulic pump unit to regulate and limit output pressure to a torque tool when the desired pre-load is reached.

Returning once again to the washer 20 (see FIGS. 1 & 2), in addition to the power generation layer 23 the washer 20 could include electronics and communication hardware layers such as a radio-frequency identification ("RFID") tag or chip layer 25—which would provide a unique identifier to its respective washer 20 and allow identification of washer location and replacement—and a radial or circumferential RF antenna layer 29. The RF signal broadcast by the washer 20 could be read by an operator, a remote operated or autonomous underwater vehicle ("ROV" or "AUV"), by a neighboring washer 20 (see FIG. 3), or by the tool 80 in communication with the washer 20 (see FIG. 4). To protect the electronics and other sensitive components of the washer 20, the washer 20 could be covered or wrapped with a protective material (the same holds true for washer 40).

Figure 7:
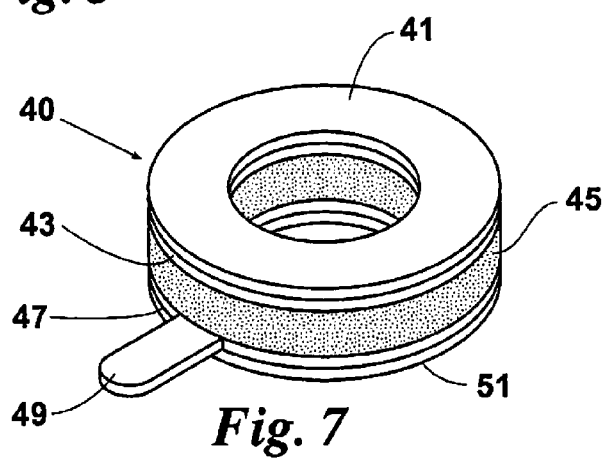
FIG. 7 is an isometric view of another preferred embodiment of the pre-load monitor or fixture in the form of a washer. The washer includes a stimulation layer having a connection tab to a power source and a detection layer having load sensing hardware.
Figure 12:
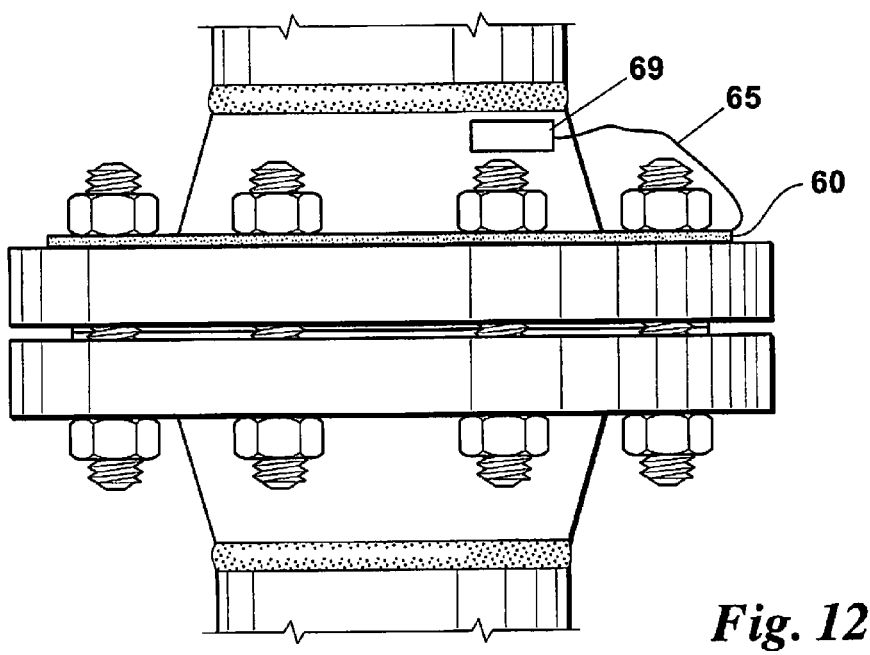
FIG. 12 is a front elevation view of the two-piece gasket embodiment of the split ring of FIG. 6 under load and connected to an external power source.

Communication with the washer 20 could be powered by an incoming wireless signal, a wired connection to an external power source (see e.g. FIG. 7 showing a tab 49 providing a connection point and FIG. 12 showing a power source 69), or by way of a capacitance or battery layer 27 in communication with the piezoelectric layer 23 (see FIG. 2). Each washer 20 could share a single wired connection with its neighbors (like that shown in FIG. 10) and communicate with a neighboring washer 20.

Regardless of the power source, the washers 20, 40 can be in communication with, and a part of, a subsea electronic information system like that disclosed in U.S. Pat. No. 8,683,869 B2 to Herley et al. or US 2014/0064029 A1 to Jaffrey ("Jaffrey"), both incorporated by reference herein. Jaffrey's system includes a subsea-located sensor interface box that includes a processor and a memory device capable of receiving and storing sensor measurement data like that provided by the washer. Additionally, the sensor interface box can be in data and power communication with the washer. A subsea retrievable data capsule may be used in connection with the box and recovered from subsea (independently of the other elements of the information system) for forensic analysis of the recorded data. A similar electronic information system could be employed in topside applications and applied to the tool 80.

Figure 6:
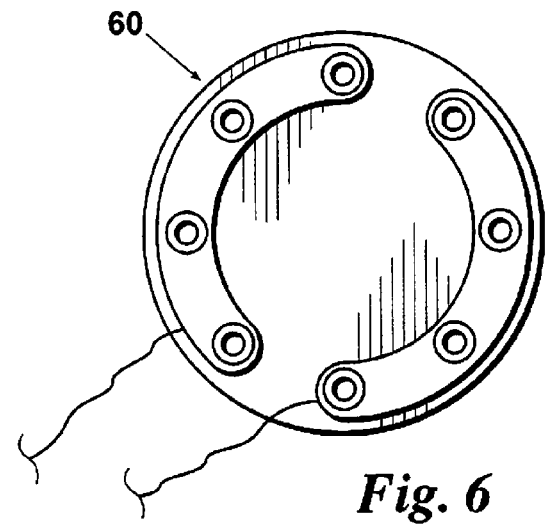
FIG. 6 is top plan view of another preferred embodiment of the pre-load monitor or fixture in the form of a half- or split ring. The ring can be constructed similarly to that of the washer of FIG. 2 or 7 for shared sensing or can be a two-piece gasket having an array of washers constructed similarly to that of the washer of FIG. 2 or 7.
Figure 10:
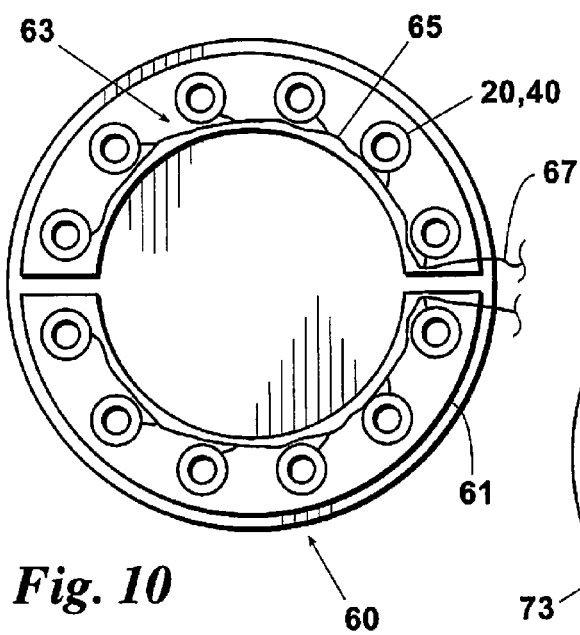
FIG. 10 is a top plan view of the split rings of FIG. 6 arranged about a flanged connection, plate or closure.
Figure 11:
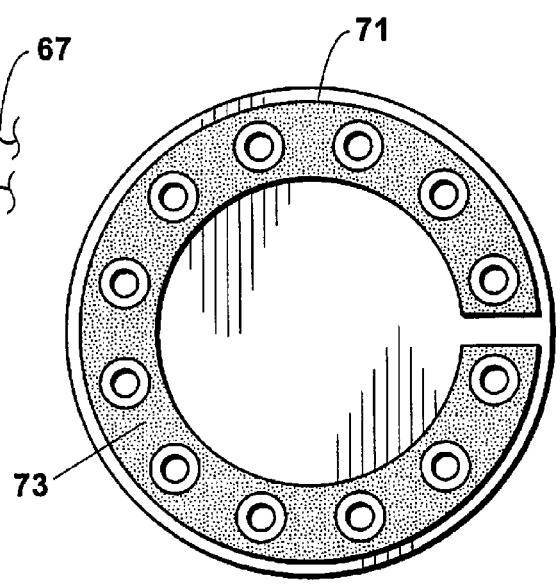
FIG. 11 is a top plan view of a molded rubber, one-piece C-ring that includes the washer of FIG. 2 or 7 local to each fastener hole of the ring.

In another preferred embodiment, the pre-load monitor 10 is in the form of a half- or split ring 61 (see FIGS. 6 & 10). The split ring 61 can be constructed similarly to that of washers 20, 40 for shared sensing or a two-piece gasket arrangement that includes an array 63 of washers 20, 40. The array 63 can be connected by a common wire 65, with a connection point 67 that places the array 63 in communication with a power source 69 (see FIG. 12). Alternatively, a C-ring 71 can be used (see FIG. 11). The rings 61, 71 operate similarly to that of washers 20, 40.

The split ring 61 or C-ring 71 can be a molded rubber 73 that contains the washer embodiment 20, 40 local to each fastener hole of the ring 61, 71. The power source 69 to the ring 61, 71—as well as to the individual washer embodiments 20, 40 previously discussed—can take many forms, such as a battery pack, an aqua battery, ROV, AUV, handheld device, piezoelectric generator (such as responds to the vibration of the operated equipment), or a wave motion operated power supply (see FIG. 12).

The following claims define the scope of the invention, including the full range of equivalents to which elements of the claims are entitled.

What is claimed:

1. A method of measuring fastener pre-load, the method comprising the steps of:

placing a clamping force on a pre-load monitor located between a washer face of a fastener and a bearing surface of a fixture arranged to receive a portion of a shank of the fastener;

measuring the fastener pre-load using electrical power generated by the pre-load monitor in response to the clamping force;

broadcasting electrical power data generated by the pre-load monitor; and calculating the fastener pre-load based upon the broadcast electrical power data;

wherein the pre-load monitor comprises:

an uppermost metallic layer proximate to said washer face of said fastener for receiving said clamping force from said fastener, and said pre-load monitor comprising a lowermost metallic layer proximate to said bearing surface of said fixture; and, located between the uppermost and lowermost metallic layers, a flexible piezoelectric material arranged to generate an electrical signal to the clamping force produced by the fastener and a radio frequency identifier RFID tag arranged to broadcast the electrical signal.

2. A method according to claim 1 wherein the placing step comprises applying torque to said fastener with a wrench having a processor and a sensor interface in communication with the pre-load monitor and a memory for receiving and storing electrical power data generated by the pre-load monitor.

3. A method according to claim 1 further comprising the step of monitoring the fastener pre-load.

4. A method according to claim 3 further comprising the monitoring step including the sub-steps of:
stimulating a portion of the pre-load monitor lying adjacent to the flexible piezoelectric material;
detecting a deformation of the flexible piezoelectric material in response to the stimulating step; and
measuring an amount of the deformation;
wherein the stimulating step occurs by way of a voltage source provided by a power supply internal to or external of the pre-load monitor.

5. A method according to claim 4 wherein the amount of deformation is determined by way of a load cell.

6. A method according to claim 3 wherein the monitoring step includes the sub-step of using a wrench adapted to apply torque to said fastener, said wrench having a processor and a sensor interface in communication with the pre-load monitor and a memory for receiving and storing electrical power data generated by the pre-load monitor.

7. A method according to claim 1 further comprising the step of powering the broadcasting step with a portion of the electrical power generated.

8. A method according to claim 1 further comprising the step of storing within the pre-load monitor a portion of the electrical power generated.

9. A method according to claim 1 further comprising the step of adjusting the fastener pre-load to account for a temperature gradient between an assembly environment and an operating environment of the fixture.

10. A system of monitoring fastener pre-load, the system comprising:
a pre-load monitor arranged for use between a washer face of a fastener and a bearing surface of a fixture arranged to receive a portion of a shank of the fastener;
the pre-load monitor having:
uppermost metallic layer proximate to said washer face of said fastener for receiving said clamping force from said fastener, and said pre-load monitor comprising a lowermost metallic layer proximate to said bearing surface of said fixture; and, located between the uppermost and lowermost metallic layers,
a flexible piezoelectric material arranged to generate electric power in response to a clamping force produced by the fastener; and
a radio frequency identifier RFID tag arranged to broadcast an amount of the electric power generated.

11. A system according to claim 10 wherein the pre-load monitor is in the form of a circular washer.

12. A system according to claim 11 further comprising a gasket material arranged about the washer.

13. A system according to claim 10 further comprising a wrench adapted to apply torque to a fastener, said wrench including a processor and a sensor interface in communication with the pre-load monitor and a memory for receiving and storing electrical power data generated by the pre-load monitor.

14. A system according to claim 13 further comprising the wrench including communication hardware.

15. A system according to claim 14 further comprising the communication hardware arranged to retrieve data from a remote database and write data to the remote database.

16. A system according to claim 14 further comprising a protective device in communication with the wrench.

17. A system according to claim 16 wherein the protective device is selected from the group consisting of an operator headset, an operator earpiece, operator eyewear, and an operator glove.

18. A system according to claim 10 further comprising the pre-load monitor including:
a stimulation layer lying adjacent to the flexible piezoelectric material and in communication with a power supply; and
a detection layer lying adjacent to the flexible piezoelectric material and arranged to detect a deformation of the flexible piezoelectric material.

19. A system according to claim 18 further comprising the detection layer including a load cell.

20. A system according to claim 10 further comprising the washer including an energy storage layer in communication with the flexible piezoelectric material, the energy storage layer including a least one of a battery and a capacitor.

* * * * *